United States Patent
Hill

(10) Patent No.: US 9,782,669 B1
(45) Date of Patent: Oct. 10, 2017

(54) RF TRACKING WITH ACTIVE SENSORY FEEDBACK

(71) Applicant: Position Imaging, Inc., Portsmouth, NH (US)

(72) Inventor: Edward L. Hill, Portsmouth, NH (US)

(73) Assignee: POSITION IMAGING, INC., Portsmouth, NH (US)

( * ) Notice: Subject to any disclaimer, the term of this patent is extended or adjusted under 35 U.S.C. 154(b) by 899 days.

(21) Appl. No.: 13/918,295

(22) Filed: Jun. 14, 2013

Related U.S. Application Data

(60) Provisional application No. 61/659,544, filed on Jun. 14, 2012.

(51) Int. Cl.
| | |
|---|---|
| G09G 5/00 | (2006.01) |
| G06F 3/02 | (2006.01) |
| G01S 3/02 | (2006.01) |
| A63F 13/219 | (2014.01) |

(52) U.S. Cl.
CPC .................................. A63F 13/04 (2013.01)

(58) Field of Classification Search
CPC .................... A63F 13/04; A63F 13/285; A63F 2300/1037; G06F 3/016; G06F 3/0346
USPC ........................... 345/156–179; 342/450–465
See application file for complete search history.

(56) References Cited

U.S. PATENT DOCUMENTS

| | | | |
|---|---|---|---|
| 3,824,596 A | 7/1974 | Guion et al. | |
| 3,940,700 A | 2/1976 | Fischer | |
| 4,328,499 A | 5/1982 | Anderson et al. | |
| 5,010,343 A | 4/1991 | Andersson | |
| 5,426,438 A | 6/1995 | Peavey et al. | |
| 5,574,468 A | 11/1996 | Rose | |
| 5,592,180 A | 1/1997 | Yokev et al. | |
| 5,600,330 A | 2/1997 | Blood | |
| 5,657,026 A | 8/1997 | Culpepper et al. | |
| 5,923,286 A | 7/1999 | Divakaruni | |

(Continued)

OTHER PUBLICATIONS

Proakis, John G. and Masoud Salehi, "Communication Systems Engineering", Second Edition, Prentice-Hall, Inc., Upper Saddle River, New Jersey, 2002; 815 pages.

(Continued)

*Primary Examiner* — Amit Chatly
(74) *Attorney, Agent, or Firm* — Schmeiser, Olsen & Watts LLP

(57) ABSTRACT

A system includes a wireless device having a radio frequency (RF) receiver, an RF transmitter, and means for producing sensory feedback to a user of the wireless device. A position-tracking system includes at least three antennae. The position-tracking system computes a multi-dimensional position of the wireless device using triangulation or trilateration based on time of arrival information from radio signals transmitted by the RF transmitter of the wireless device and received by each of the at least three antennae. A processor receives the multi-dimensional position of the wireless device determined by the position-tracking system, correlates the multi-dimensional position to a point of interest registered with an interactive software program that produces a virtual reality environment, and generates, in response to the multi-dimensional position correlated with the registered point of interest, data configured to activate the sensory feedback producing means of the wireless device.

15 Claims, 4 Drawing Sheets

(56) References Cited

U.S. PATENT DOCUMENTS

| | | | |
|---|---|---|---|
| 5,953,683 A | 9/1999 | Hansen et al. |
| 6,167,347 A | 12/2000 | Lin |
| 6,255,991 B1 | 7/2001 | Hedin |
| 6,292,750 B1 | 9/2001 | Lin |
| 6,409,687 B1 | 6/2002 | Foxlin |
| 6,417,802 B1 | 7/2002 | Diesel |
| 6,496,778 B1 | 12/2002 | Lin |
| 6,512,748 B1 | 1/2003 | Mizuki et al. |
| 6,593,885 B2 | 7/2003 | Wisherd et al. |
| 6,630,904 B2 | 10/2003 | Gustafson et al. |
| 6,683,568 B1 | 1/2004 | James et al. |
| 6,697,736 B2 | 2/2004 | Lin |
| 6,721,657 B2 | 4/2004 | Ford et al. |
| 6,750,816 B1 | 6/2004 | Kunysz |
| 6,989,789 B2 | 1/2006 | Ferreol et al. |
| 7,009,561 B2 | 3/2006 | Menache et al. |
| 7,143,004 B2 | 11/2006 | Townsend et al. |
| 7,190,309 B2 | 3/2007 | Hill |
| 7,193,559 B2 | 3/2007 | Ford et al. |
| 7,236,091 B2 | 6/2007 | Kiang et al. |
| 7,295,925 B2 | 11/2007 | Breed et al. |
| 7,409,290 B2 | 8/2008 | Lin |
| 7,443,342 B2 | 10/2008 | Shirai et al. |
| 7,533,569 B2 | 5/2009 | Sheynblat |
| 7,612,715 B2 | 11/2009 | Macleod |
| 7,646,330 B2 | 1/2010 | Karr |
| 7,876,268 B2 | 1/2011 | Jacobs |
| 8,269,624 B2 | 9/2012 | Chen et al. |
| 8,457,655 B2 | 6/2013 | Zhang et al. |
| 9,482,741 B1 | 11/2016 | Min et al. |
| 2002/0021277 A1* | 2/2002 | Kramer | G06F 3/016 345/156 |
| 2003/0053492 A1 | 3/2003 | Matsunaga |
| 2003/0120425 A1 | 6/2003 | Stanley et al. |
| 2003/0195017 A1* | 10/2003 | Chen | H01Q 1/246 455/562.1 |
| 2004/0095907 A1 | 5/2004 | Agee et al. |
| 2004/0176102 A1 | 9/2004 | Lawrence et al. |
| 2005/0143916 A1 | 6/2005 | Kim et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0061469 A1 | 3/2006 | Jaeger et al. |
| 2006/0066485 A1* | 3/2006 | Min | G01S 5/06 342/465 |
| 2006/0101497 A1 | 5/2006 | Hirt et al. |
| 2007/0060384 A1 | 3/2007 | Dohta |
| 2008/0048913 A1 | 2/2008 | Macias et al. |
| 2008/0204322 A1 | 8/2008 | Oswald et al. |
| 2008/0316324 A1 | 12/2008 | Rofougaran et al. |
| 2009/0149202 A1 | 6/2009 | Hill et al. |
| 2009/0243932 A1 | 10/2009 | Moshfeghi |
| 2010/0103173 A1 | 4/2010 | Lee et al. |
| 2010/0103989 A1 | 4/2010 | Smith et al. |
| 2010/0123664 A1* | 5/2010 | Shin | G06F 1/1626 345/169 |
| 2011/0006774 A1 | 1/2011 | Balden |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2012/0013509 A1 | 1/2012 | Wisherd et al. |
| 2012/0127088 A1* | 5/2012 | Pance | G06F 3/016 345/173 |
| 2012/0184285 A1 | 7/2012 | Sampath |
| 2013/0021417 A1 | 1/2013 | Ota et al. |
| 2013/0036043 A1 | 2/2013 | Faith |
| 2013/0314210 A1 | 11/2013 | Schoner et al. |
| 2014/0253368 A1 | 9/2014 | Holder |
| 2014/0300516 A1 | 10/2014 | Min et al. |
| 2015/0009949 A1 | 1/2015 | Khoryaev et al. |
| 2015/0091757 A1 | 4/2015 | Shaw et al. |
| 2015/0169916 A1 | 6/2015 | Hill et al. |
| 2015/0323643 A1 | 11/2015 | Hill et al. |
| 2016/0256100 A1 | 9/2016 | Jacofsky et al. |
| 2016/0286508 A1 | 9/2016 | Khoryaev et al. |
| 2016/0371574 A1 | 12/2016 | Nguyen et al. |

OTHER PUBLICATIONS

U.S. Appl. No. 13/293,639, filed Nov. 10, 2011, Edward Hill (26 pages).

Schmidt & Phillips, "INS/GPS Integration Architectures", NATO RTO Lecture Seriers, First Presented Oct. 20-21, 2003; 24 pages.

Farrell & Barth, "The Global Positiong System & Interial Navigation", 1999, McGraw-Hill; pp. 245-252.

Grewal & Andrews, "Global Positioning Systems, Inertial Nagivation, and Integration", 2001, John Weiley and Sons, pp. 252-256.

Jianchen Gao, "Development of a Precise GPS/INS/On-Board Vehicle Sensors Integrated Vehicular Positioning System", Jun. 2007, UCGE Reports No. 20555; 245 pages.

Yong Yang, "Tightly Coupled MEMS INS/GPS Integration with INS Aided Receiver Tracking Loops", Jun. 2008, UCGE Reports No. 20270; 205 pages.

Goodall, Christopher L., "Improving Usability of Low-Cost INS/GPS Navigation Systems using Intelligent Techniques", Jan. 2009, UCGE Reports No. 20276; 234 pages.

Debo Sun, "Ultra-Tight GPS/Reduced IMU for Land Vehicle Navigation", Mar. 2010, UCGE Reports No. 20305; 254 pages.

Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.

Adrian Schumacher, "Integration of a GPS aised Strapdown Inertial Navigation System for Land Vehicles", Master of Science Thesis, KTH Electrical Engineering, 2006; 67 pages.

Vikas Numar N., "Integration of Inertial Navigation System and Global Positioning System Using Kalman Filtering", M.Tech Dissertation, Indian Institute of Technology, Bombay, Mumbai, Jul. 2004; 69 pages.

Jennifer Denise Gautier, "GPS/INS Generalized Evaluation Tool (GIGET) for the Design and Testing of Integrated Navigation Systems", Dissertation, Stanford University, Jun. 2003; 160 pages.

Farrell, et al., "Real-Time Differential Carrier Phase GPS=Aided INS", Jul. 2000, IEEE Transactions on Control Systems Technology, vol. 8, No. 4; 13 pages.

Filho, et al., "Integrated GPS/INS Navigation System Based on a Gyrpscope-Free IMU", DINCON Brazilian Conference on Synamics, Control, and Their Applications, May 22-26, 2006; 6 pages.

Santiago Alban, "Design and Performance of a Robust GPS/INS Attitude System for Automobile Applications", Dissertation, Stanford University, Jun. 2004; 218 pages.

International Search Report & Written Opinion in international patent application PCT/US12/64860, mailed on Feb. 28, 2013; 8 pages.

Pourhomayoun, Mohammad and Mark Fowler, "Improving WLAN-based Indoor Mobile Positioning Using Sparsity," Conference Record of the Forty Si11-14/2016 IDSth Asilomar Conference on Signals, Systems and Computers, Nov. 4-7, 2012, pp. 1393-1396, Pacific Grove, California.

"ADXL202/ADXL210 Product Sheet," Analog Devices, Inc., Analog.com, 1999; 11 pages.

* cited by examiner

RF TRACKING WITH ACTIVE SENSORY FEEDBACK

RELATED APPLICATION

This application claims the benefit of and priority to U.S. provisional application No. 61/659,544, filed Jun. 14, 2012, titled "RF Tracking with Active Sensory Feedback," the entirety of which is incorporated by reference herein.

FIELD OF THE INVENTION

The invention relates generally to systems and methods for human-computer interaction. More particularly, the invention relates to position tracking of game controllers and other types of 3D input devices to enhance virtual reality experience of a user with sensory feedback, for example, tactile, auditory, and/or visual feedback.

BACKGROUND

In human-computer interaction there is a natural evolution, enabled by technical innovation, toward a more immersive experience for users. Consumers have witnessed a major movement by television manufacturers to provide "3D" TV to provide realistic images that appear to be actual images seen in true free space rather than on a two-dimensional screen. Game controller manufacturers provide auditory and tactile feedback to game controllers, adding to the feel of a player being in the game or battle by emitting sounds or by vibrating the hand held controller as an avatar or similar image on the screen is hit by bullet, punch, etc. These are direct sensory inputs created to make interacting with a computer more life-like.

The NINTENDO® WII REMOTE® wireless controller is an example of recent state of the art in user interactive controllers for computer display game systems. It is a movable wireless remote controller that incorporates inertial sensors to provide motion capture to their controllers. It is hand-held by the interactive user, and transmits input data to the computer controlled game display system via conventional short-range wireless RF transmissions (e.g., a BLUETOOTH® system), and receives data via infrared light sensors.

Previous systems using magnetic, optical, ultrasound and non-integrated circuit inertial devices were cumbersome and expensive. Motion capture using inertial sensing like the Wii® allows people to use their own movement to initiate an interaction with the video game. This inertial sensing was a breakthrough for game playing and pushed the "virtual reality" experience past simple visual, tactile, or audible interaction like the original VR systems that became popular in the 1980's.

After the success of the Wii®, many new applications were created to add to the immersive experience of games or related software. Additional competitive systems were introduced, including Sony's MOVE™ controller, which uses inertial systems and camera tracking technology that tracks an active optical marker to register controller's position in three-dimensional space. Other technologies have focused on eliminating the need for a controller and/or peripheral; for example, Microsoft's KINECT®, a camera based gesture-tracking system that uses reflected infrared light to make measurements on the light reflected off the objects being tracked. Both the MOVE™ and KINECT® register either the user's peripheral or the user's body in a software program's digital environment. This three-dimensional registration is used to fuse the user and user's environment with the digital program being interacted with on screen. High-end motion-capture systems still use these same optical techniques.

These input devices have allowed consumers to interact with games in new and highly intuitive ways. These current state of the art movable controllers also provide haptic feedback. Haptic feedback is commonly used in arcade and video game controllers. An example of this feature is the simulated automobile steering wheels that are programmed to provide a "feel" of the road. As the user makes a turn or accelerates, the steering wheel responds by resisting turns or slipping out of control. Other simple examples include handlebar shake in motorcycle-based games, gun shake in shooting games, joystick vibrations, etc. Sony's DUALSHOCK™ technology and the handheld remote controller for the NINTENDO® WII® feature such technology.

A consumer 3D touch device with high resolution three-dimensional force feedback, allowing the simulation of objects, textures, recoil, momentum, physical presence of objects in games through haptic feedback initiated at the device is now available from NOVINT™ HAPTICS™. The feedback is enabled by actuators that apply the forces to the skin for touch feedback to simulate touching something such as a virtual object on the screen, in free space. The actuator provides mechanical motion in response to an electrical stimulus. Most early designs of haptic feedback use electromagnetic technologies such as vibratory motors with an offset mass, such as the pager motor, that is in most cell phones or voice coils where a central mass or output is moved by a magnetic field. The electromagnetic motors typically operate at resonance and provide strong feedback, but have limited range of sensations. Next-generation actuator technologies are beginning to emerge, offering a wider range of effects thanks to more rapid response times. Next generation haptic actuator material technologies include electro-active materials, which includes piezoelectric and polymer materials.

SUMMARY

In one aspect, the invention features a system for wirelessly tracking a multi-dimensional position of and for providing sensory feedback to a wireless device. The system comprises a wireless device having a radio frequency (RF) receiver, an RF transmitter, and means for producing sensory feedback to a user of the wireless device. A position-tracking system includes at least three antennae. The position-tracking system computes a multi-dimensional position of the wireless device using triangulation or trilateration based on time of arrival information from radio signals transmitted by the RF transmitter of the wireless device and received by each of the at least three antennae. A processor receives the multi-dimensional position of the wireless device determined by the position-tracking system, correlates the multi-dimensional position to a point of interest registered with an interactive software program that produces a virtual reality environment, and generates, in response to the multi-dimensional position correlated with the registered point of interest, data configured to activate the sensory feedback producing means of the wireless device.

In another aspect, the invention features a method of providing sensory feedback to a wireless device. The method comprises receiving, at three or more antennae, radio signals emitted by a wireless device being used to interact with a virtual reality environment produced by an interactive computer program. A multi-dimensional position of the wireless device is computed using triangulation or trilateration based on time of arrival information from the radio signals received at the three or more antennae. The computed multi-dimensional position of the wireless device is correlated to a point of interest registered with the interactive computer program. Data configured to activate a particular sensory feedback are generated in response to the correlated multi-dimensional position. The particular sensory feedback at the wireless device is activated in response to the generated data.

DETAILED DESCRIPTION

Figure 1:
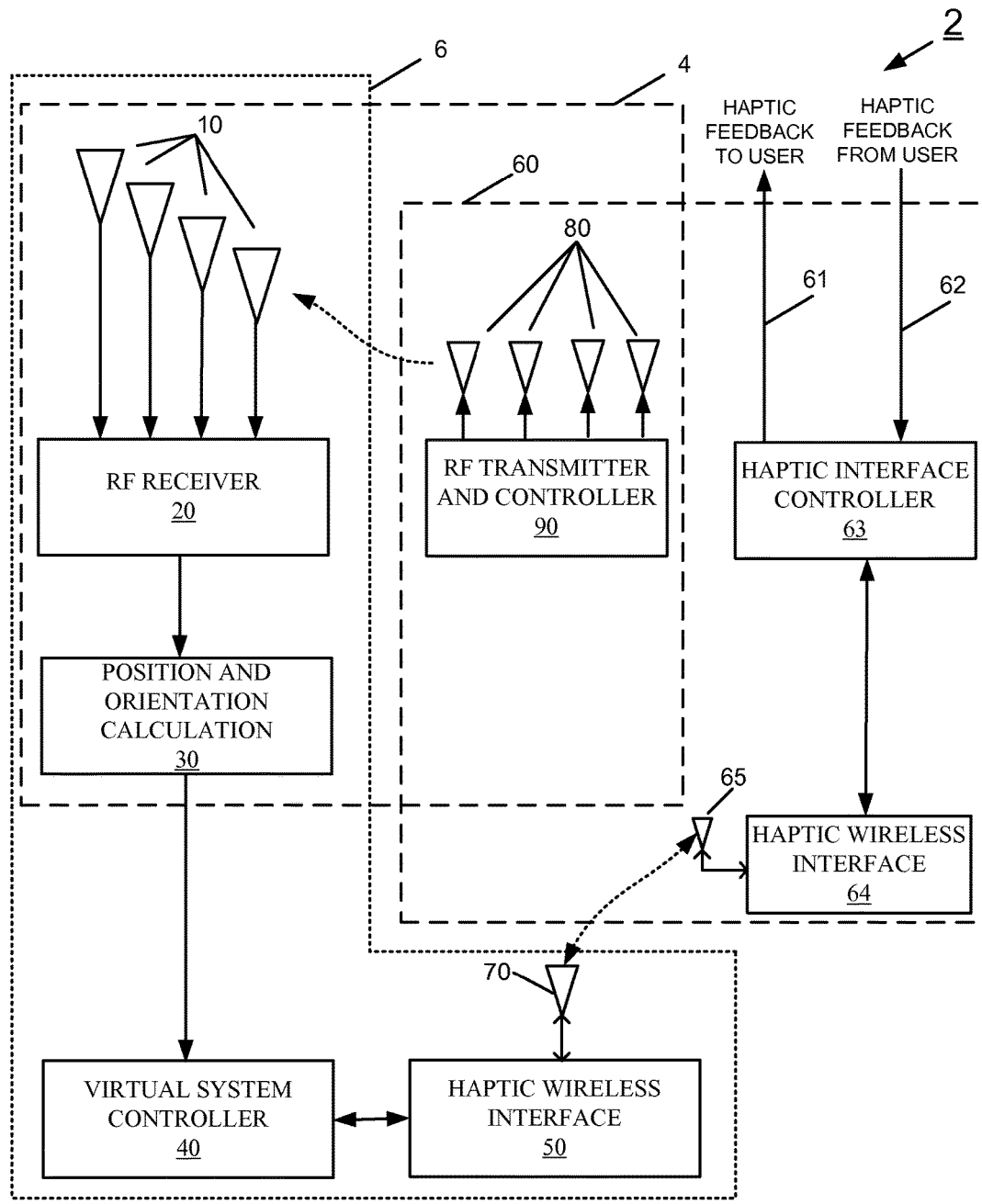
FIG. 1 is a block diagram of an embodiment of a RF tracking system and a wireless haptic feedback system with a separate interface for haptic data transmission.

Radio frequency (RF) communication for remote wireless data transfer is ubiquitous in the electronics industry. Consequently, hardware supporting the RF communication industry has evolved and advanced over the past twenty years producing robust, cost effective solutions for wirelessly sending data. Over the decades, RF hardware has benefited from cost reduction and sensitivity increases. In addition, algorithms used for improving signal integrity continue to evolve and improve. Position tracking of wireless devices using RF communications has become a technical reality. An example of a system capable of using RF communications to track the position of a wireless transmitter can be found in U.S. application Ser. No. 13/079,800, filed Apr. 4, 2011, and titled, "Multiplexing Receiver System", the entirety of which application is incorporated by reference herein. Specifically, the position of a wireless device with an RF transmitter, in free space, can be computed using time as the basis of measurement for making the position calculations. Systems that can utilize such RF-based tracking, using radio signal time of arrival comparisons at multiple antennae connected to the system but disposed in different locations, can achieve multi-dimensional (2D or 3D) position accuracy results of 1 cm or less in x, y, and z planes. A time-based position-tracking technique that allows systems to resolve the position of a wireless device rapidly and with such high accuracy resolution enables improvements to existing applications and the generation of new applications for human-computer free space kinematic interaction involving wireless peripherals, whether held or worn by the user.

In addition to enabling high accuracy position tracking, RF-based communication can provide users with line-of-sight independence through better signal propagation characteristics, unlike linear signal paths experienced with light sensed by cameras or infrared (IR) sensors. A sensory feedback system that can accurately track the actual position of a user's handheld device or controller with RF data enables new applications not easily attainable with a gesture tracking camera system or an inertial sensing motion capture technique. Larger working volumes than camera systems and line-of-sight independence can make an RF-based position-tracking technology the technique of choice for registering wireless device's position in various interactive computer programs. With a larger working volume and line-of-sight independence, interactive games can be created or improved, and new training simulation and therapy programs, used to improve kinesthetic performance and proprioception awareness, become possible.

With the improvement of accuracy this time-based RF position tracking system can deliver, there are other areas of improvement for human-computer interaction. For example, by sensing the actual position of the wireless device accurately, a user can receive feedback from the system that makes interaction more realistic. In addition to improving the interactive functionality through visual cues seen by the user on a screen that represent the location of the wireless device in 3D space, a system can also provide tactile, visual, or auditory feedback (or any combination thereof) to the wireless device as the device travels within free space to locations of interest registered by the interactive software program. Applying tactile or auditory feedback at known or targeted points in space can improve kinematic interaction within virtually generated environments. Improved kinematic interaction can bring more realism and increased effectiveness to computer programs for physical therapy, kinematic-based training, gaming, CAD or other three dimensional design applications.

As described herein, for a sensory feedback system to be effective, the system accurately calculates the position of the wireless device, in three dimensions, and initiates tactile stimuli and/or other sensory feedback at specific points in 3D-space registered with a computer program. For example, a golf video game can achieve a higher level of realistic interaction as the position of a game controller (the wireless device) is tracked and displayed on the screen. As the user moves the game controller in free space, the image of the game controller, in this example displayed as a golf club, also moves in relation to the game controller held by the user. In this application, the game controller can supply haptic and/or auditory feedback as the position of the controller in free space correlates with the position of the ball on the screen. The user can thus "feel" and "hear" the impact of the game controller (visually represented as the golf club) hitting the ball registered on the screen. This combination of position tracking and tactile and/or auditory feedback provides a much more immersive level of human-computer interaction.

In brief overview, sensory feedback systems described herein combine RF-based position tracking of a wireless device with a sensory feedback function performed at or in the wireless device. This wireless device can include a single transceiver or a low power radio receiver or receivers, a separate transmitter or transmitters, and an actuator or similar device that can produce sensory feedback to the user. The wireless device can also include one or more inertial sensors, for example, accelerometers, gyroscopes, and magnetic sensors, to provide an orientation of the wireless device to the position-tracking system. The user uses this wireless device to engage in a virtual reality environment produced an interactive software program. Utilizing time of arrival information of radio signals, sent from the wireless device and received by a network of separate receive antennae, a computer (or CPU), in communication with the antenna network, dynamically computes a 2D or 3D position of the wireless device, thereby enabling accurate position tracking. The computed positional information is correlated to points of interest registered within a virtual environment produced by the interactive software program. A computer uses these registered positions to provide sensory feedback to the user as the user engages with the virtual environment provided by the interactive software program.

The sensory feedback functionality is built into the handheld device, which can be worn rather than held, and includes a driving apparatus, a sensing device, a controller, and software. The sensory feedback system is configured to process data in a simulated interactive software program from a virtual reality environment displayed on a computer monitor (or TV, projector, or other visual display device) and to transmit data to a driver control card. The driver control card is configured to control the driving apparatus. The sensing device can measure user force feedback (e.g., intensity of grip, rapidity of motion) and transmit this data back to the system. This feedback cycle, namely, the user measurement from the sensing device, virtual reality submersion through position registration within an interactive software program, and haptic feedback, provides a full 3D rendered spatial experience.

FIG. 1 shows an embodiment of a wireless haptic feedback system 2 including an RF tracking system 4, a base station 6, and a handheld device 60. The RF tracking system 4 includes RF receiver antennae 10, an RF receiver 20, a position and orientation calculation algorithm 30 running on a computing device, RF transmitter antennae 80, and an RF transmitter and controller 90. The base station 6 includes the RF receiver antennae 10, the RF receiver system 20, the position and orientation calculation algorithm 30, a virtual system controller 40, a haptic wireless interface 50, and haptic wireless interface antenna 70.

Each of the RF receiver antennae 10 are typically fixed at different locations in the RF tracking system 4. One or more of the RF antennae can serve to provide a tracking reference signal. All or a portion of the receiver antennae can be passive receivers. In brief overview, receiver antennae 10 receive the radio signal transmitted from the transmitters of the wireless device, and the RF tracking system 4 generates timing information from these radio signals (e.g., from their carrier wave phase information) in order to make comparisons among the antennae 10. The position and orientation calculation algorithm 30 of the RF tracking system 4 computes the physical position of the wireless device 60 in 3D space using the known fixed and separate physical locations of each receiver antenna 10, comparing the timing information associated with the receiver antennae 10, and performing triangulation or trilateration calculations based on this information.

The handheld wireless device 60 can be any type of electronics device typically powered by a self-contained power source and, for example, held, grasped, or worn by a user. The handheld wireless device 60 is comprises two functions: a transmitter function necessary for tracking the position of the device 60, and a haptic feedback function necessary for sensory feedback. The RF transmitter and controller block 90 and transmitter antennae block 80 accomplish the transmitter function. The RF transmitter and controller block 90 generates the signals and waveforms required to feed the transmitter antennae block 80, such that when such signals and waveforms are received by the receiver antennae 10 and processed by the RF receiver system 20, a position of the hand held device 60 can be ascertained using the position and orientation calculation algorithm 30 running on the computing device.

A haptic device provides user input 62 to and receives user output 61 from a realistic virtual reality (VR) environment in conjunction with the RF tracking system 4 and the virtual system controller 40. The virtual system controller 40, which typically runs on a processor (not shown) with associated memory, program storage and interfaces, includes a program interface, haptic simulation rule generation and other functionality for integrating the user inputs and user outputs and positioning data into the interactive software program that produces the VR environment. The virtual system controller 40 (and associated hardware) can be separate from or integrated with the computer system that runs the interactive software program. The virtual system controller 40 is configured to process data from the RF tracking system 4 to change the VR environment over time.

Sensory feedback to the user (user output 61) can consist of, for example, vibrations, shocks, pressures, friction, motion restriction, and sound, as is known in the art. To produce the sensory feedback, a haptic interface controller 63 converts commands from the virtual system controller 40 into user feedback. The haptic interface controller 63 performs a transfer function necessary to control the various haptic feedback devices 61 into "realistic" levels of feedback, dependent on the type of feedback and the mechanization of the feedback. In a typical digital system, a digital-to-analog converter, coupled with the appropriate other circuitry, is included in the haptic interface controller 63. Visual and auditory feedback can be performed separately and remotely from the handheld wireless device 60, for example, at the base station 6, or at an electronic device in communication with the base station 6.

In a similar manner, haptic feedback from the user (user input 62) can consist of trigger pulls, pressure, temperature, sweat, heart rate, sound, etc., as is known in the art. These devices are interfaced to the haptic interface controller 63, which typically incorporates an analog-to-digital converter.

Two-way RF communication between the handheld device 60 and the base station 6, for transmitting and receiving haptic data, occurs between the haptic wireless interfaces 50 and 64. The haptic feedback device, that receives the user output 61 and produces the user input 62, communicates through the haptic interface controller 63 with the virtual system controller 40 using a haptic wireless interface 64. The haptic wireless interface 64 includes an antenna 65 for bi-directional communication with the wireless antenna 70 of the haptic wireless interface 50 coupled to the virtual system controller 40. These interfaces 50, 64 use standard RF techniques, known in the art, to transmit and receive data corresponding to feedback to and from the user. These haptic wireless interfaces 50 and 64 use antennae 70 and 65, respectively, to transmit and receive this haptic data.

Figure 2:
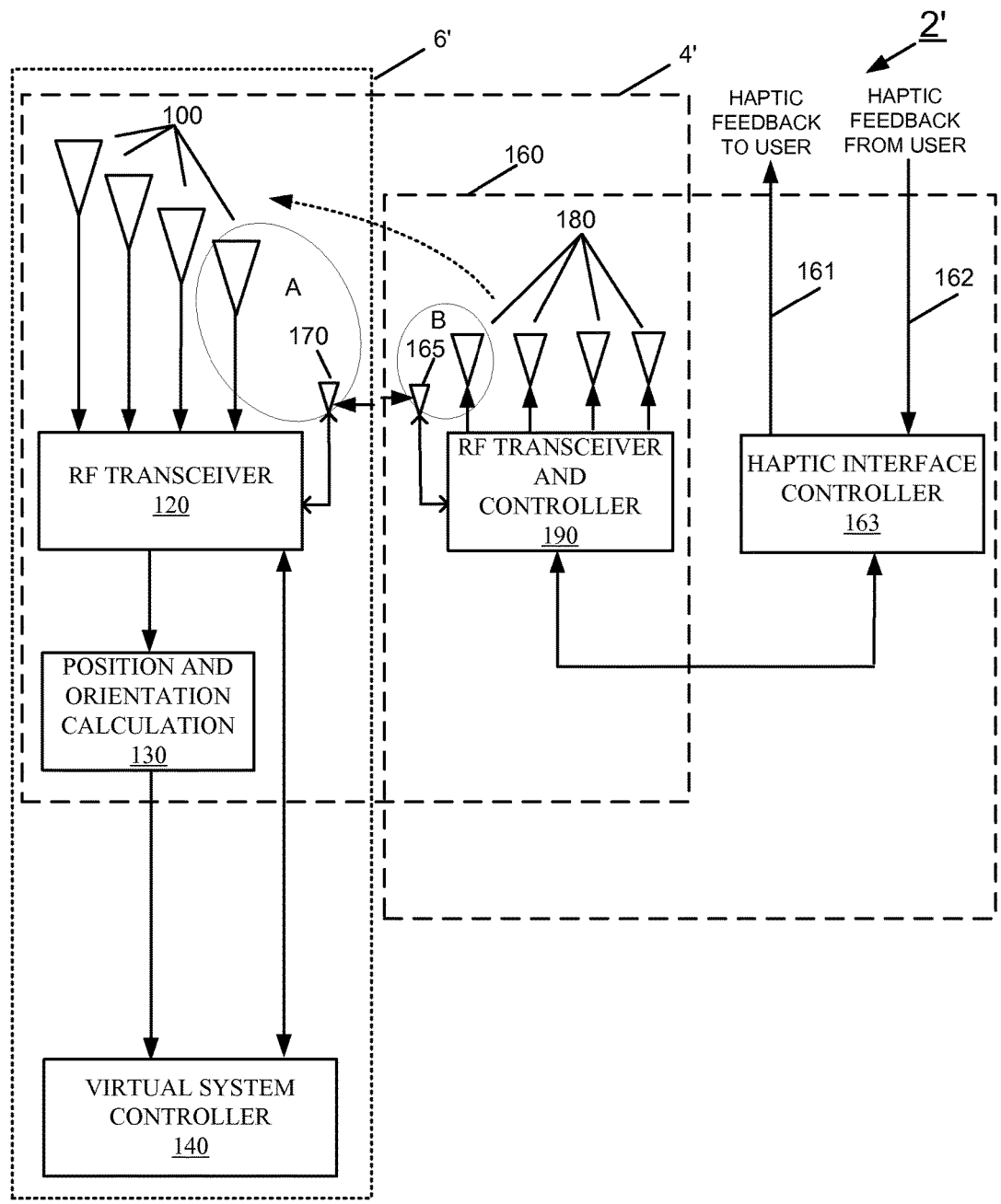
FIG. 2 is a block diagram of another embodiment of a RF tracking system and a wireless haptic feedback system with a combined interface for RF tracking and haptic data transmission.

FIG. 2 shows another embodiment of a wireless haptic feedback system 2' including an RF tracking system 4', a base station 6', and a handheld device 160. The RF tracking system 4' includes RF receiver antennae 100, 170, an RF transceiver 120, a position and orientation calculation algorithm 130 running on a computing device, RF transmitter antennae 180, and an RF transceiver and controller 190. The base station 6' includes the RF receiver antennae 100, 170, the RF transceiver 120, the position and orientation calculation algorithm 130, and a virtual system controller 140. This embodiment is similar to the embodiment of FIG. 1, with notable differences being that the RF tracking system 4' uses the transceivers 120, 190 instead of the RF receiver 20 and RF transmitter 90. Accordingly, the two-way RF communication between the handheld device 160 and the base station 6 (for transmitting and receiving haptic data) occurs between these transceivers 120, 190.

Handheld device 160 is held, grasped, worn, etc., by the user and is typically powered by a self-contained power source. The handheld device 160 is comprised of two functions: a transmitter function necessary for tracking the position of the device 160, and a haptic feedback function necessary for sensory feedback. The RF transceiver and controller block 190 and transmitter antennae block 180 accomplish the transmitter function. The RF transceiver and controller block 190 generates the signals and waveforms required to feed the transmitter antennae block 180, such that when such signals and waveforms are received by the receiver antennae 100 and processed by the RF transceiver 120, a position of the handheld device 160 can be ascertained using the position and orientation calculation algorithm 130 running on a computing device.

A haptic device acts as a user input 162 and user output 161 of a virtual environment in conjunction with the RF tracking system 4' and the virtual system controller 140. The virtual system controller 140, which typically runs on a processor (not shown) with associated memory, program storage and interfaces, includes a program interface, haptic simulation rule generation and other functionality for stitching the user inputs and outputs and positioning data and into a realistic VR environment. The virtual system controller 140 is configured to process data from the RF tracking system 4' to change the virtual environments evolution with time.

Haptic feedback to the user (output 161) can consist of vibrations, shocks, pressures, friction, motion restriction, sound, etc. as is known in the art. These devices are controlled by a haptic interface controller 163, which converts commands from the virtual system controller 140 into user feedback. The haptic interface controller 163 accomplishes a transfer function necessary to control the various haptic feedback devices 161 into "realistic" levels of feedback, dependent on the type of feedback and the mechanization of the feedback. In a typical digital system, a digital to analog converter, coupled with the appropriate other circuitry, is included in the haptic interface controller 163.

In a similar manner, haptic feedback from the user (user input 162) can consist of trigger pulls, pressure, temperature, sweat, heart rate, sound, etc., as is known in the art. These devices are also interfaced to haptic interface controller 163, which typically incorporates an analog-to-digital converter.

The haptic feedback device that receives the user output 161 and produces the user input 162 communicates, through the haptic interface controller 163, with the virtual system controller 140 using a wireless interface. The wireless interface is bi-directional to the virtual system controller 140. These interfaces use standard RF techniques, known in the art, to transmit and receive data corresponding to feedback to and from the user. RF transceiver 120 and RF transceiver 190 use antennae 170 and 165, respectively, to transmit and receive this data.

In addition to providing the tracking transmitter function, transceiver block 190 contains a transmitter and receiver section for antenna 165. The antenna 165 communicates with the antenna 170, which is connected to the RF transceiver 120. The RF transceiver 120 also contains a transmitter and receiver section for the antenna 170, in addition to the receive function needed for tracking. The RF transceiver 120 communicates with the virtual system controller 140.

As is known in the art, RF transceivers provide transmitter and receiver functionality. This allows the receiver antennae 100 to receive signals while the antenna 170 can transmit and receive signals related to the haptic interface, all from RF transceiver hardware 120. In a similar manner, the transmitter antennae 180 can transmit data while the antenna 165 can transmit and receive signals related to the haptic interface, all from RF transceiver hardware 190. As is also known in the art, multiplexing schemes, such as switching, time multiplexing, frequency multiplexing, phase multiplexing, etc., can be designed into the RF transceiver 120 and/or the RF transceiver 190, such that antennae may be shared. For example, the antenna 170 and one of receiver antennae 100 can be combined to reduce the antenna count (see insert A). In a similar manner, antenna 165 and one of receiver antennae 180 can be combined to reduce the antenna count (see insert B).

Figure 3:
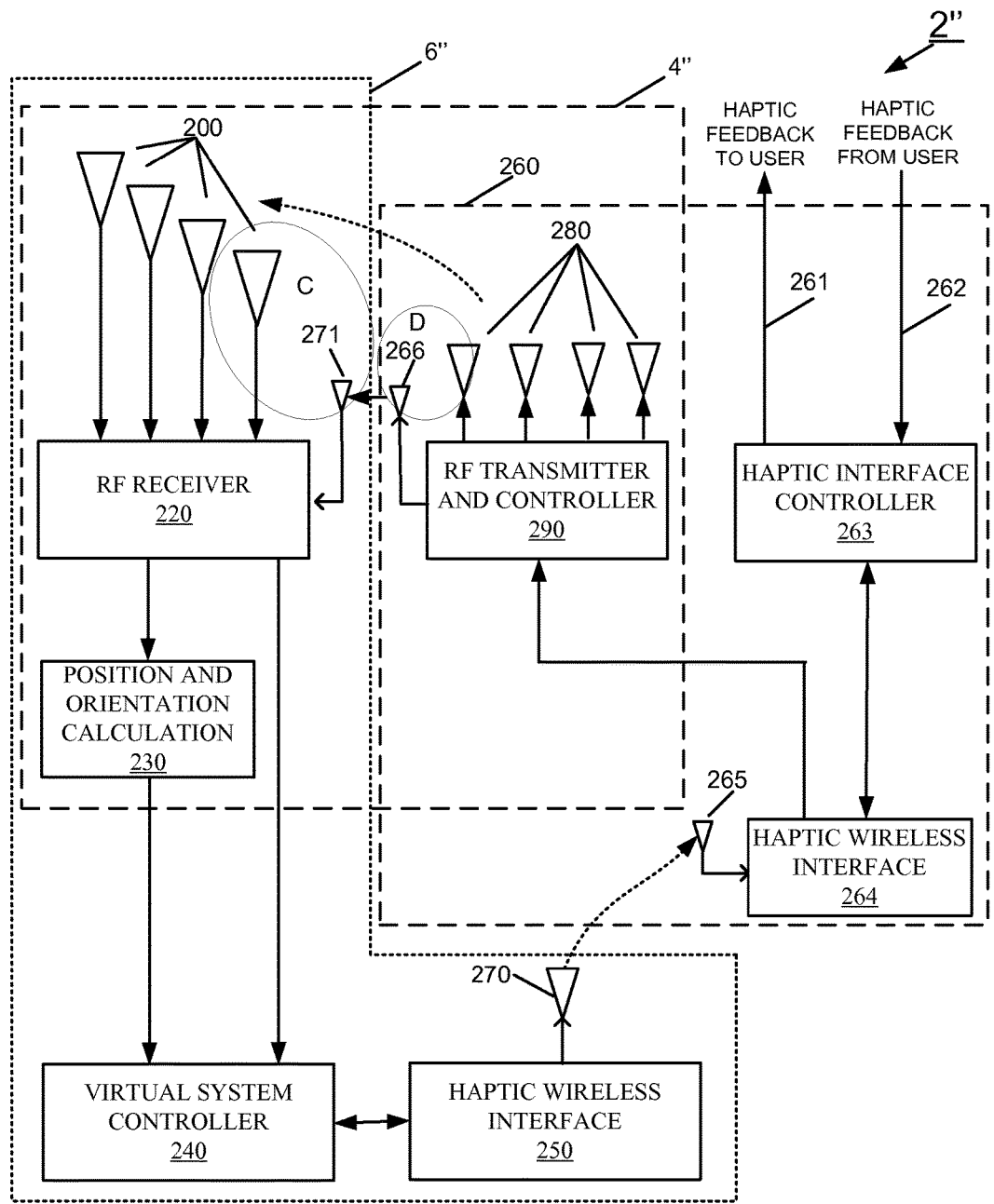
FIG. 3 is a block diagram showing another embodiment of a RF tracking system and a wireless haptic feedback system with a partially combined interface for RF tracking and haptic data transmission.

FIG. 3 shows an embodiment of a haptic feedback system 2" including an RF tracking system 4", a base station 6", and a handheld device 260. The RF tracking system 4" includes RF receiver antennae 200, 271, an RF receiver 220, a position and orientation calculation algorithm 230 running on a computing device, RF transmitter antennae 266, 280, and an RF transmitter and controller 290. The base station 6" includes the RF receiver antennae 200, 271, the RF receiver 220, the position and orientation calculation algorithm 230, a virtual system controller 240, a haptic wireless interface 250, haptic wireless interface antennae 270. The RF receiver antennae 200, 271 are typically fixed and act as a tracking reference frame. This embodiment is similar to the embodiment of FIG. 1, with a notable difference being that the two-way wireless RF communication between the handheld device 260 and the base station 6" (for transmitting and receiving haptic data) RF tracking system 4' is split into two uni-directional paths, one path using the strengths of the unidirectional tracking system components (from the RF transmitter and controller 290 to RF receiver 220) and the other path using a unidirectional interface (from the haptic wireless interface 250 to a haptic wireless interface 264 in the device 260).

The handheld device 260 is held, grasped, worn, etc. by the user and is typically powered by a self-contained power source. The handheld 260 is comprised of two functions: a transmitter function necessary for tracking the position of the device 60, and a haptic feedback function necessary for sensory feedback. The RF transmitter and controller block 290 and transmitter antennae block 280 accomplish the transmitter function. The RF transmitter and controller 290 generates the signals and waveforms required to feed the transmitter antennae 280, such that when such signals and waveforms are received by the receiver antennae 200 and processed by the RF receiver 220, a position of the hand held device 260 can be ascertained using the position and orientation calculation algorithm 230 running on the computing device.

A haptic device acts as a user input 262 and user output 261 of a virtual environment in conjunction with the RF tracking system 4" and the virtual system controller 240. The virtual system controller 240, which typically runs on a processor (not shown) with associated memory, program storage and interfaces, includes a program interface, haptic simulation rule generation and other functionality for stitching the user inputs and outputs and positioning data and into a realistic VR environment. The virtual system controller 240 is configured to process data from the RF tracking system 4" to change the virtual environments evolution with time.

Haptic feedback to the user (user output 261) can consist of vibrations, shocks, pressures, friction, motion restriction, sound, etc. as is known in the art. These devices are controlled by a haptic interface controller 263, which converts commands from the virtual system controller into user feedback. The haptic interface controller 263 realizes the transfer function necessary to control the various haptic feedback devices 261 into "realistic" levels of feedback, dependent on the type of feedback and the mechanization of the feedback. In a typical digital system, a digital-to-analog converter, coupled with the appropriate other circuitry, is included in the haptic interface controller 263.

In a similar manner, haptic feedback from the user (user input 262) can consist of trigger pulls, pressure, temperature, sweat, heart rate, sound, etc., as is known in the art. These devices are also interfaced to the haptic interface controller 263, which typically incorporates an analog-to-digital converter. The haptic feedback device, which receives the user output 261 and produces the user input 262, communicates, through the haptic interface controller 263, with the virtual system controller 240 using two wireless interfaces.

Transmission of the data from the user haptic interface 264 to the virtual system controller 240 over one of the two wireless interfaces occurs through the same RF components used for position tracking (i.e., RF components 290, 280, 200, 220). Separate antennae/channels are shown in FIG. 3 for the haptic wireless interface to the virtual system controller 240. These separate channels comprise a transmitting antenna 266 and a receiving antenna 271. These antennae 266, 271 may be physically separate antennae, as shown, or they may be incorporated into the tracking system antennae framework. In FIG. 3, insert C indicates that receiver antennae 200 and antenna 271 are combined. In a similar manner, transmitter antennae 280 and antenna 266 are combined, as signified by insert D. The RF receiver 220 separates data into position-tracking data and haptic interface data, and sends the haptic interface data to the virtual system controller 240 for further processing.

Transmission of data back, from the virtual system controller 240 to the user haptic device as haptic feedback 261, occurs over the other of the two wireless interfaces. This transmission is accomplished by the haptic wireless interface 250 transmitting the data over the haptic wireless interface antenna 270 at the base station 6" to its counterpart antenna 265 in the handheld device 260. The haptic wireless interface 264 processes the data received by the antenna 265 and sends the appropriate information to the haptic interface controller 263, for conversion into the appropriate formats for controlling the feedback to the user.

As is known in the art, multiplexing schemes, such as switching, time multiplexing, frequency multiplexing, phase multiplexing, etc., can be designed into RF receiver 220 and/or the RF transmitter and controller 290 such that antennae may be shared. For example, the antenna 271 and one of receiver antennae 200 can be combined to reduce the antenna count (see insert C). In a similar manner, antenna 266 and one of transmitter antennae 280 can be combined to reduce the antenna count (see insert D).

Figure 4:
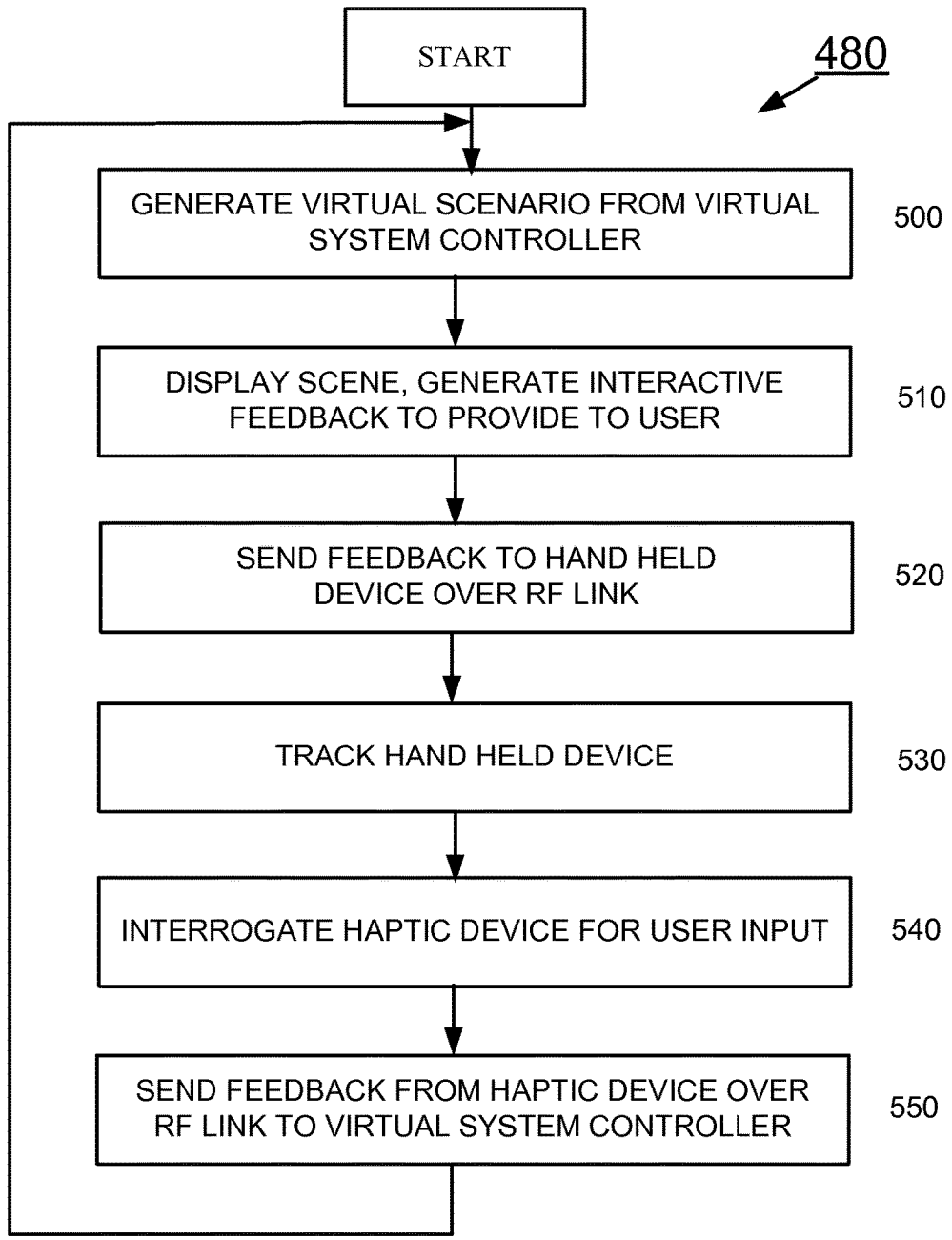
FIG. 4 is flow diagram of an embodiment of a process of information flow in a virtual reality system.

FIG. 4 shows an embodiment of a process 480 that can be performed by any of the embodiments described in connection with FIG. 1, FIG. 2, and FIG. 3. For purposes of the description of the process 480, reference is made to the elements of FIG. 1, unless specifically indicated otherwise. Initially, the virtual system controller 40 generates (step 500) a virtual reality scenario. This virtual reality scenario can take, for example, the form of a game or a simulation. Various points of interest are registered in the virtual reality scenario. The virtual reality scenario is presented (step 510) to the user, where visual scenes, cues, and haptic data are generated for supplying to the user. To generate the haptic data, the virtual system controller 40 correlates the computed position of the handheld device to the points of interest identified in the virtual reality scenario. When the handheld device moves to one of these points of interest, the virtual system controller 40 identifies and generates the appropriate type of haptic data associated with that point of interest.

The base station 6 transmits (step 520) haptic data to the handheld device 60. Substantially simultaneously, the tracking system components of the RF tracking system 4 tracks (step 530) the handheld device 60. Additionally, user haptic input 62 is monitored (step 540) for changes and sent back (step 550) to the virtual system controller 40 using an RF link between the antennae 65, 70 of the haptic wireless interfaces 64, 50, respectively. The process 480 repeats until the virtual reality scenario ends.

As known in the art, various other methods and means are available to enhance the tracking performance of the described RF tracking system 4. Inertial sensors such as accelerometers and gyroscopes, within the wireless handheld device, can provide short-term navigation improvements. Magnetic sensors can determine orientation relative to the earth's magnetic field. These sensory inputs can be optimally combined, such as with a Kalman filter, to provide better tracking accuracy and responsiveness.

In addition, although each of the embodiments described herein perform the position tracking calculations at the RF tracking system separate from the wireless handheld device, in other embodiments, the handheld device is configured to perform the calculations. In such embodiments, the wireless device receives the timing information acquired from the radio signals received by the receiver antennae and calculates its own position from this timing information. Further, the wireless device can send its calculated position back to the base station for use by the virtual system controller. The virtual system controller uses the position data, in conjunction with the human-computer interactive software, to produce haptic alerts inputs. These haptic alerts inputs, when sent to the wireless device, activate the haptic or auditory (or both) function at the wireless device.

In still another embodiment, the wireless device can perform the position calculation and execute the human-computer interactive software. This embodiment can forego any need for the wireless device to transmit the calculated position to the base station or for the base station to transmit the haptic alert inputs to the wireless device. The wireless device, itself, generates the haptic alerts (and subsequent sensory feedback) based on its calculated position and points of registration within the human-computer interactive software.

In addition, although described herein with a single wireless device, it is to be understood that the various aforementioned embodiments of sensory feedback systems can simultaneously track the positions of multiple wireless devices engaged in virtual reality environment produced by an interactive computer program. These sensory feedback systems can activate sensory feedback in each of these devices individually, in accordance with the particular points of interests with which their respective positions correlate.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system.

In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C#, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A system for wirelessly tracking a multi-dimensional position of, and for providing sensory feedback to, a wireless device, the system comprising:
    a wireless device having a radio-frequency (RF) receiver, an RF transmitter and controller, and means for producing sensory feedback to a user of the wireless device, the RF transmitter transmitting radio signals;
    a position-tracking system including a base station having at least three antennae in communication with a receiver, the at least three antennae receiving the radio signals transmitted by the wireless device, the receiver acquiring timing information from the radio signals received by the at least three antennae, the base station including an RF transmitter that transmits radio signals conveying the timing information, the RF receiver of the wireless device receiving the timing information conveyed by the radio signals transmitted by the RF transmitter of the base station and the controller of the wireless device computing a physical multi-dimensional position of the wireless device within a physical three-dimensional environment using triangulation or trilateration based on the received timing information; and
    a processor receiving the computed physical multi-dimensional position of the wireless device, correlating the computed physical multi-dimensional position of the wireless device to a point of interest registered with an interactive software program that produces a virtual reality environment, and generating, in response to the physical multi-dimensional position of the wireless device within the physical three-dimensional environment correlated with the registered point of interest, haptic data configured to activate the sensory feedback producing means of the wireless device.

2. The system of claim 1, wherein the means for producing sensory feedback produces any one or combination of haptic feedback, auditory feedback, or visual feedback.

3. The system of claim 1, wherein the wireless device includes one or more inertial sensors to provide an orientation of the wireless device to the position-tracking system.

4. A method of providing sensory feedback to a wireless device, the method comprising:
    receiving, at three or more antennae, radio signals emitted by a wireless device being used to interact with a virtual reality environment produced by an executing interactive computer program;
    acquiring timing information from the radio signals received by the at least three antennae;
    receiving, by the wireless device, radio signals conveying the timing information;
    computing, by the wireless device, a physical multi-dimensional position of the wireless device within a three-dimensional environment using triangulation or trilateration based on timing information from the radio signals received at the three or more antennae;
    correlating the computed physical multi-dimensional position of the wireless device within the three-dimensional environment to a point of interest registered with the interactive computer program;
    generating, in response to the correlated physical multi-dimensional position of the wireless device, haptic data configured to activate a particular sensory feedback; and
    activating, in response to the haptic data, the particular sensory feedback at the wireless device.

5. The method of claim 4, wherein the particular sensory feedback includes any one or combination of haptic feedback, auditory feedback, or visual feedback.

6. The method of claim 4, further comprising providing an orientation of the wireless device determined by an inertial sensor to the position-tracking system.

7. A method of providing sensory feedback to a wireless device, the method comprising:
    registering points of interest within a software program;
    receiving radio signals transmitted by the wireless device;
    transmitting radio signals to the wireless device with timing information acquired from the received radio signals;
    computing, by the wireless device, a physical position of an object within a physical three-dimensional environment based on the timing information transmitted to the wireless device;
    correlating the physical position of the object within the physical three-dimensional environment to one of the points of interest registered within the software program; and
    generating haptic data configured to activate a particular sensory feedback on the wireless device in response to correlating the physical position of the object to one of the points of interest.

8. The method of claim 7, further comprising:
transmitting radio signals with the haptic data to the wireless device in response to receiving the radio signals transmitted by the wireless device that conveys the computed physical position of the object; and
activating, in response to receiving the haptic data, the particular sensory feedback at the wireless device.

9. The method of claim 8, wherein the wireless device comprises the object, and further comprising:
receiving the radio signals transmitted from the wireless device at three or more receiver antennae; and
acquiring the timing information from the radio signals transmitted from the wireless device and received at the three or more receiver antennae.

10. The method of claim 9, wherein the transmission of the haptic data occurs over a different RF channel from an RF channel by which the radio signals transmitted from the wireless device are received at the three or more receiver antennae.

11. The method of claim 9, wherein the transmission of the haptic data to the wireless device occurs over an RF channel that shares a receiver antenna of the three or more receiver antennae with an RF channel over which the radio signals that are transmitted from the wireless device and received at the three or more receiver antennae.

12. The method of claim 7, further comprising receiving radio signals with haptic input over an RF channel, and wherein the transmission of the haptic data to the wireless device occurs over a different RF channel from the RF channel over which the radio signals with the haptic input are received.

13. The method of claim 7, wherein the wireless device comprises the object, and further comprising:
receiving the radio signals transmitted by the wireless device at three or more receiver antennae over a first RF channel;
acquiring the timing information from the radio signals that are transmitted by the wireless device and received at the three or more receiver antennae; and
receiving radio signals with haptic input from the wireless device over a second RF channel that shares a receiver antenna of the three or more receiver antenna with the first RF channel.

14. The method of claim 7, further comprising receiving the computed physical position of the object within the physical three-dimensional environment in radio signals transmitted by the wireless device over an RF channel.

15. The method of claim 7, wherein the steps of correlating the physical position of the object within the physical three-dimensional environment to one of the points of interest registered within the software program and of generating haptic data configured to activate a particular sensory feedback on the wireless device in response to correlating the physical position of the object to one of the points of interest are performed by the wireless device.

* * * * *